United States Patent [19]
Makino et al.

[11] Patent Number: 4,464,517
[45] Date of Patent: Aug. 7, 1984

[54] PROCESS FOR THE SUSPENSION POLYMERIZATION OF VINYL CHLORIDE

[75] Inventors: Tetsuya Makino; Masakatsu Itazawa; Kenzi Ogura, all of Kurashiki, Japan

[73] Assignee: Ryo-Nichi Co., Ltd., Tokyo, Japan

[21] Appl. No.: 316,568

[22] Filed: Oct. 31, 1981

Related U.S. Application Data

[63] Continuation of Ser. No. 151,747, May 20, 1980, abandoned.

[30] Foreign Application Priority Data

May 25, 1979 [JP] Japan .................................. 54-64650

[51] Int. Cl.$^3$ .............................................. C08F 2/20
[52] U.S. Cl. ...................................... 526/88; 422/138; 526/67; 526/202; 526/344.2
[58] Field of Search .......................... 526/67, 88, 202

[56] References Cited

U.S. PATENT DOCUMENTS 2,754,289 7/1956 Meyer ........................... 526/344.2 X
3,578,649 5/1971 Badguerahanian .......... 526/344.2 X
4,089,365 5/1978 Miserlis ........................... 422/138 X

*Primary Examiner*—C. A. Henderson
*Attorney, Agent, or Firm*—Abelman, Frayne, Rezac & Schwab

[57] ABSTRACT

A batch suspension of vinyl chloride is processed in a reaction zone with external cooling zone wherein the volume ratio of total monomer charge to water is more than 0.8 and dispersing agent is 0.03 to 0.1% based on monomers. Circulation of reaction mixture to cooling zone is initiated after conversion of monomer is at least 20%.

9 Claims, 1 Drawing Figure

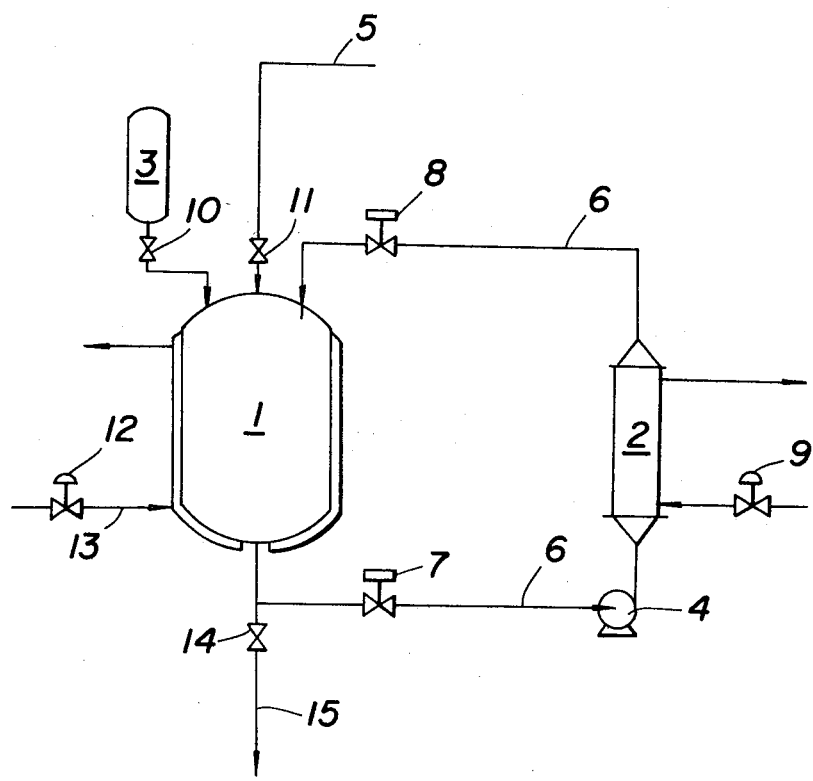

PROCESS FOR THE SUSPENSION POLYMERIZATION OF VINYL CHLORIDE

This is a continuation of application Ser. No. 151,747 filed May 20, 1980, now abandoned.

BACKGROUND OF THE INVENTION

The present invention relates to a process for the suspension polymerization of vinyl chloride, and particularly to a novel process for the batchwise suspension polymerization of vinyl chloride, which provides a substantial improvement in the productivity, and wherein the polymerization is carried out in such a manner that after the monomer conversion has reached a certain level, at least a part of the polymerization reaction mass formed is circulated to an external cooling zone which is provided separately from the polymerization reaction zone.

Heretofore, the suspension polymerization of vinyl chloride has been carried out in such a manner that water, a vinyl chloride monomer, a polymerization initiator, a dispersing agent and, if necessary, an additive or additives, are fed into a polymerization vessel equipped with a jacket, through which cooling water is circulated to remove the heat of polymerization and thereby to maintain the reation temperature at a predetermined level.

The productivity per volume of the polymerization vessel may be increased by increasing the amount of the monomer fed into the reactor, and by properly selecting the type and amount of the polymerization initiator, it is possible to perform the polymerization reaction uniformly and thereby to shorten the polymerization time. In any case, however, the polymerization reaction is vigorously exothermic, and in order to remove the generated heat by the cooling water circulated through the jacket, the amount of the monomer to be fed and the amount of the initiator to be used must be limited to a certain level.

Accordingly, it is necessary to improve the cooling efficiency for removal of the heat generated by the polymerization reaction in order to improve the productivity. It has been proposed and industrially adopted to carry out the cooling by means of a refrigerator in addition to the cooling water jacket, thereby to increase the cooling efficiency. However, this method is economically disadvantageous. It has also been proposed and industrially in use to provide a condenser at an upper portion of the polymerization vessel, thereby enhancing the cooling efficiency. However, the abovesaid method is dependant on the evaporation, cooling and reflux of the monomer itself and the cooling effect of such system is limited. Besides, the product obtained by the method is of a poor quality and particularly it tends to suffer from increased fish eye formation.

Accordingly, it is an object of the present invention to eliminate the above-mentioned drawbacks and to present an industrially advantageous process for the suspension polymerization of vinyl chloride, in which, as a heat removal means which is fundamentally different from the conventional cooling means, an external circulation cooling of the polymerization reaction mass is employed, whereby the productivity per volume of the polymerization vessel can substantially be increased.

Generally, circulation of the reaction mixture to an external cooling apparatus is a very efficient method for removal of the heat from the reaction mixture, since it is thereby possible to enlarge the heat transfer surface area for contact with the reaction mixture. In the case of the polymerization reaction of vinyl chloride, however, polymer build-up tends to occur on the inner wall of the external cooling apparatus and on the inner surface of the circulation pipe line, as well as on the surface of the inner wall of the polymerization vessel, and such polymer build-up tend to clog the pipe line whereby it becomes difficult to control the temperature and thus they are likely to cause a serious hazard. For this reason, an external cooling method has not been industrially employed in the polymerization of vinyl chloride.

Further, the quality of polyvinyl chloride (hereinafter referred to an "PVC") depends primarily upon the morphological properties of the polymer particles, and it is likely that the morphological properties of the polymer particles be substantially deformed by the external circulation of the polymerization reaction mixture. Thus, the difficulty in the quality control of the polymer particles has been one of the reasons for not employing the external circulation cooling method in the conventional process for the suspension polymerization of vinyl chloride. Recently, a method for the suspension polymerization of vinyl chloride was disclosed wherein an unusually larger amount of a dispersing agent is used while the monomer is used in a smaller amount, and thus the slurry is circulated to an external cooling apparatus at a lower concentration (B.P. No. 2,001,659). In the method, however, the amount of the dispersing agent used is substantially greater than the normal method and accordingly the method brings about a product of extremely poor quality; namely, the products tend to be poor in plasticizer absorption property, gelation property, thermal stability, color transparency, and electrical insulation property and to suffer from fish eye formation. Further, the amount of the monomer used and accordingly the productivity per batch are smaller than usual. If the amount of dispersing agent were decreased to obtain a polymer of improved quality, polymer build-up would then occur on the inner surface of the external cooling apparatus and on the inner surface of the circulation pipe line even when an inhibitor for polymer build-up would be used, thus creating a serious disadvantage. Such polymer build-up would be even greater particularly when the amount of the monomer used is increased to a volume ratio of the monomer to water of 0.8 to 1.3 so as to increase the productivity.

SUMMARY OF THE INVENTION

The present inventors have conducted various researches for the polymerization with use of an external cooling system to overcome the above mentioned difficulties. As the result, it has unexpectedly been found that PVC of good quality comparable to that of the prior art is obtainable without polymer build-up on the inner wall of the external cooling apparatus and on the inner surface of the circulation pipe line by carrying out the polymerization under certain polymerization conditions even when a large amount of the monomer is used while using the dispersing agent in an amount smaller than that used in the above mentioned method, namely by starting the circulation to the external cooling zone when the conversion of the monomer in the reaction mixture reaches at least 20% by weight.

Thus, the present invention provides a process for the batchwise suspension polymerization of vinyl chloride, which comprises carrying out the suspension polymerization of vinyl chloride, optionally together with any other ethylenically unsaturated monomer copolymerizable therewith, by means of a polymerization vessel and an external cooling apparatus connected thereto via a circulation pipe line, in an aqueous medium consisting essentially of water in the presence of a dispersing agent and an oil-soluble polymerization initiator, and which is characterized in that the volume ratio of the monomer to said water is kept at a level of more than 0.8 and the amount of the dispersing agent used is 0.03 to 0.1% by weight based on the amount of the monomer and the circulation of the polymerization reaction mixture to the external cooling apparatus is initiated after the conversion of the monomer reaches at least 20% by weight.

According to the process of the present invention, it is possible to effect the removal of the heat of the polymerization reaction by the jacket of the polymerization vessel as well as by the external cooling apparatus, and accordingly it is possible to accomplish the polymerization reaction in a short period of time without giving rise to deterioration of the quality of the product and thus to improve the productivity remarkably.

DETAILED DESCRIPTION

Now, the present invention will be described in more detail. According to the method of the present invention, the heat generated at the initial stage of the reaction for the suspension polymerization of vinyl chloride is removed by the jacket of the polymerization vessel for the reasons mentioned hereinafter, and after a certain period of time, the heat of reaction will be removed with additional use of the external cooling apparatus. Namely, it is essential that the circulation of the reaction mixture to the external cooling apparatus be commenced after at least 20% by weight, preferably at least 25% by weight, of the monomer charged is converted to the polymer. If the circulation is commenced at the conversion of less than 20% by weight, the distribution of particle sizes of the resulting product becomes very wide and the product becomes inferior in its quality, or it sometimes happens that the normal suspension state is destroyed and the polymer becomes agglomerated unless the amount of the dispersing agent is limited so as not to sacrifice the product quality and the amount of the monomer charge is limited below a certain level. Besides, polymer build-up is likely to take place heavily on the inner wall of the external cooling apparatus and on the inner surface of the circulation pipe line and thereby to prevent the circulation of the reaction mixture, whereby it becomes difficult to remove the heat of reaction. Further, once the polymer build-up occurs on the inner wall, it is extremely difficult to remove them from the wall. For these reasons, it is extremely important that the circulation should be commenced after the conversion has reached at least 20% by weight.

In order to improve the productivity, it is preferred to start the circulation at an early stage of the reaction, i.e. while the conversion is still as relatively low as 20%. If the circulation is commenced after the conversion has reached as high as 70% by weight, little improvement in the productivity is expected.

The external cooling apparatus to be used in the process of the present invention may be, for example, a tubular heat exchanger, a trombone type heat exchanger, or a coil type heat exchanger. It may be any other type of heat exchanger which is capable of cooling a polymerization reaction mass in a slurry state.

The circulation of the reaction mixture may be carried out in an appropriate conventional manner. Namely, a pump may be provided at an appropriate position of the circulation pipeline to withdraw the reaction mixture from the polymerization vessel and to supply it to the heat exchanger and then return the cooled mixture to the vapor phase or the liquid phase within the polymerization vessel. The linear velocity of the circulation of the reaction mixture varies depending upon the capacity of the heat exchanger and the size of the polymerization vessel, and it must be kept at a level not to give a bad effect to the formation of the polymer particles and it is normally at 1 to 4 m/sec. Further, the structures and arrangements of the circulation pipeline and heat exchanger must be selected not to form a dead space where linear velocity abruptly drops.

According to the process of the present invention, it is possible to readily remove the heat of the polymerization reaction in the above mentioned manner, and it is possible to shorten the polymerization time by using a polymerization initiator in an amount greater than usual or by using an initiator having a strong activity.

Firstly, water, the monomer, a dispersing agent, a polymerization initiator and, if necessary, an additional additive, are charged in a polymerization vessel, and the polymerization is carried out by stirring the mixture of the total charge at a predetermined temperature. The amount of the initiator should be within a range where the heat of reaction can be controlled by the jacket and is usually 0.01 to 5.0% based on the amount of the monomer. The amount of the initiator to be added after the conversion of the monomer has reached 20% by weight is normally within a range of 0.01 to 5.0% on the basis of the amount of the monomer. By the addition of this additional amount of the initiator, the polymerization is accelerated. On the other hand, the heat of reaction is increased but it can be removed by the external cooling apparatus. Thus it is possible to shorten the time required for the polymerization.

The polymerization initiator to be used in the process of the present invention may be any initiator which is normally used for the polymerization of vinyl chloride. For example, there may be mentioned organic peroxides such as benzoyl peroxide, lauroyl peroxide, 3,5,5-trimethylhexanoyl peroxide, tertiary butyl peroxy-pivalate, tertiary butyl peroxy-neodecanoate, diisopropyl peroxy-dicarbonate, dioctyl peroxy-dicarbonate, acetyl cyclohexyl sulfonyl peroxide, or diethoxyethyl peroxy-dicarbonate; azo compounds such as azobisisobutyronitrile or azobisdimethylvaleronitrile; and other redox catalysts. These initiators may be used individually alone or in a combination of two or more.

Further, according to the process of the present invention, the removal of the heat of reaction can be conducted readily and the suspension is stable, and accordingly it is possible to charge the monomer in a substantially greater amount than usual, whereby it is possible to increase the productivity.

Namely, it is usual that the suspension polymerization of vinyl chloride in the prior art is conducted at a ratio of the monomer to water being 0.6 to 10.0. Whereas, according to the process of the present invention, it is possible to increase the ratio to a level of at least 0.8 or as high as 1.3. There is a certain upper limit in the amount of the dispersing agent in view of the quality control. However, once the circulation has been started after the conversion has reached 20%, the suspension is stable, and so, it is possible to add the additional monomer even at a low concentration of the dispersing agent. Thus, it is possible to increase the volume ratio of the monomer to water to 1.0 to 1.3 inclusive of the added monomer.

In an actual example of the process, the monomer is charged in an amount within a range where the heat of polymerization reaction can be controlled by the jacket. Polymerization is begun normally at a charge ratio of the monomer to water of 0.6 to 1.0, preferably 0.8 to 1.0, and after the commencement of the cooling of the polymerization reaction mixture by means of the external cooling apparatus, an additional amount of the monomer is added to bring the charge ratio of the monomer to water to be 1.0 to 1.3 and, if necessary, an additional amount of the polymerization initiator is added thus increasing the amount of the monomer charge and speeding up the polymerization reaction, whereby it is possible to obtain a highly concentrated polymer in the aqueous medium.

Thus, it is possible to add additional amounts of the monomer and the polymerization initiator without causing the deterioration of the quality of the product. This is extremely advantageous for the reason that a high productivity can thereby be realized.

The dispersing agent to be used in the process of the present invention may be any dispersing agent which is normally used for the suspension polymerization of vinyl chloride. For instance, cellulose derivatives such as methyl cellulose, hydroxypropylmethyl cellulose, hydroxyethyl cellulose, or carboxymethyl cellulose, partially saponified polyvinyl alcohol, a copolymer of vinyl acetate maleic acid anhydride, gelatin, starch or the like, may be used alone or in combination. The amount of the dispersing agent should be within a range where it does not cause the deterioration of the quality of the product and is normally at most 0.1% by weight on the monomer basis. If the concentration is less than 0.03% by weight, the suspension becomes unstable, and such low concentration is not acceptable.

In the process of the present invention, the monomer is used in a greater amount than usual and the reaction mixture is forcibly circulated to the external cooling apparatus, and accordingly it is preferred to use a dispersing agent having a superior dispersing power and dispersing stability and which does not impair the quality of the product. As a result of research for a dispersing agent to meet these requirements, it has been found that the dispersing agent should preferably have a surface tension of less than 50 dynes/cm as measured in a 0.1% aqueous solution at 20° C. and a viscosity of less than 500 cps as measured in a 4% aqueous solution at 20° C. As specific examples of dispersing agents which have these characteristics, there may be mentioned a partially saponified polyvinyl alcohol having a saponification degree of less than 83 molar %, hydroxypropyl cellulose or methyl hydroxypropyl cellulose.

According to the present invention, the reaction mixture is circulated after the conversion of the monomer has reached 20%, thereby preventing polymer build-up in the external cooling apparatus and in the circulation pipe line. In order to completely prevent the polymer build-up, there have recently been proposed a method in which a compound capable of preventing polymer build-up is added to the polymerization reaction system, or a method in which such a compound is coated on the inner wall of the external cooling apparatus and the inner surface of the circulation pipe line or a method wherein water or an aqueous solution of said compound is introduced in the vicinity of the inner surface of the circulation pipe line. Any of these methods is utilizable for advantageously carrying out the present invention. These methods are disclosed for example in Japanese Patent Publication No. 46554/1976, Japanese Patent Publication No. 24951/1977, Japanese Patent Publication No. 36312/1976, Japanese Pre-Exam. Publication No. 74586/1978 and Japanese Patent Publication No. 24954/1977.

The vinyl monomer copolymerizable with vinyl chloride monomer to be used in the process of the invention may be any ethylenically unsaturated monomer copolymerizable with vinyl chloride as known to those skilled in the art, and may be, for instance, olefins such as ethylene, propylene and the like; vinyl esters such as vinyl acetate, vinyl stearate and the like; vinyl esters such as ethyl vinyl ether, cetyl vinyl ether, and the like; acrylic acid esters; esters or anhydrides of maleic or fumaric acid; aromatic vinyl compounds such as styrene; or nitrile compounds such as acrylonitrile. Such monomer other than vinyl chloride can be used in an amount of up to 20% by weight based on the total monomer charge.

Further, other additives which are normally used in the suspension polymerization of vinyl chloride, such as a chain transfer agent, a thermal stabilizer, an antioxidant, a plasticizer or an emulsifying agent may be added to the polymerization system of the present invention, as the case requires, without departing from the scope of the present invention.

The accompanying drawing is a flow diagram schematically showing one embodiment of the present invention. Procedures for the actual operation of the present invention will now be described with reference to the drawing.

In the drawing, reference numeral 1 designates a polymerization vessel, reference numeral 2 is an external cooling apparatus, reference numeral 3 is a tank for reagents to be added, reference numeral 4 is a pump for circulating a slurry of the polymerization reaction mixture, reference numeral 5 is a monomer supply line and reference numeral 6 is a pipe line for the circulation of the slurry.

With such an arrangement as above, removal of the heat of polymerization is carried out in the following manner: After the polymerization reaction in the polymerization vessel 1 has proceeded to a predetermined conversion, valves 7 and 8 are opened, and the circulation pump 4 is operated to introduce a polymerization slurry via the circulation pipe line 6 into the external cooling apparatus 2 whereby the slurry is cooled, and to return the cooled slurry to the polymerization vessel.

The cooling rate at the external cooling apparatus 2 is controlled by adjusting the amount of the cooling water fed to the outer jacket of the cooling apparatus by manipulating the control valve 9.

The polymerization vessel 1 has dual cooling systems, i.e. cooling by means of the jacket (wherein the cooling water is introduced from line 13) and cooling by means of the external cooling apparatus 2. The control of the polymerization temperature may be made by means of either one or both of the two systems. The temperature control system should be chosen by carefully studying the exothermic behavior of the polymerization reaction. If an arrangement is made such that the temperature control signal is fed back only to one of the cooling systems (e.g. only to the control valve 12 for supplying cooling water to the jacket of the polymerization vessel), the other cooling system (e.g. the external cooling apparatus) may be adapted to maintain a predetermined cooling efficiency.

After the commencement of the cooling of the polymerization reaction mixture by means of the external cooling apparatus 2, the polymerization initiator may be added, if necessary, from the reagent supply tank 3 by opening the valve 10 thereby to facilitate the polymerization reaction. The polymerization reaction may also be facilitated by raising the polymerization temperature.

Further, during the cooling of the slurry by means of the external cooling apparatus, it is possible to add a monomer from the monomer supply line 5 by opening the valve 11, thereby to ensure increase productivity.

When the polymerization reaction has reached a predetermined level within a predetermined period of time, the polymerization is stopped by addition of a polymerization inhibitor from the reagent supply tank 3. The termination of the polymerization reaction may also be made simply by removing the remaining monomer from the polymerization vessel. The polymerization reaction product is withdrawn from the slurry withdrawal line 15 by opening the valve 14.

Now, the process of the present invention will be described with reference to working examples. However, the present invention should not be regarded as limited by these examples. In order to prevent polymer build-up, the inner surfaces of the polymerization vessel and the external cooling apparatus used in these working examples and comparative examples were treated with an aqueous solution containing potassium xanthate.

EXAMPLE 1

The polymerization equipment as shown in the drawing was used. The volume of the polymerization vessel 1 was of the 400 liters. The stirring impeller was Pfaudler type. The rotational speed was 300 rpm. The heat transfer surface area of the external cooling apparatus 2 was 0.1 m$^2$.

Introduced into the polymerization vessel were 130 liters of deionized water, 66 g. of a partially saponified polyvinyl alcohol having a surface tension of 47 dynes/cm as a 0.1% aqueous solution and a viscosity of 35 cps as a 4% aqueous solution, and 50.8 g of an isoparaffin solution containing 50% of dioctyl peroxy-dicarbonate as the polymerization initiator. The vessel was closed and the air therein was replaced with nitrogen. Then, 120 liters of vinyl chloride monomer were introduced. Agitation was started and at the same time, hot water was circulated in the jacket of the polymerization vessel to raise the temperature within the vessel to 58° C. whereupon the exothermic reaction was started. The hot water was replaced by cold water, and the polymerization was conducted for 3 hours at 58° C., until the conversion reached 30%. Then, the circulation of the polymerization slurry to the external cooling apparatus was started. At the same time, 60.9 g of the isoparaffin solution containing 50% of dioctyl peroxydicarbonate was added to accelerate the polymerization reaction. The heat removal control during the external cooling operation was carried out in such a manner that the heat removal rate by means of the external cooling apparatus was kept at 6,000 kcal/hr and the heat removal rate by means of the jacket of the polymerization reaction was adjusted within the range of 0 to 6,000 kcal/hr to maintain the polymerization temperature at a predetermined constant level. Due to the acceleration of the polymerization reaction, the heat generation by the polymerization reaction reached more than twice the level before the acceleration. The circulation rate of the polymerization slurry to the external cooling apparatus was adjusted to 5 m$^3$/hr. The velocity of the flow of the polymerization slurry in the external cooling pipe line varies depending upon the cross sectional areas of the pipes at different portions but it is usually within the range of 1.5 to 3.0 m/sec.

The presence in the polymerization vessel gradually decreased as the polymerization proceeded. When the pressure in the polymerization reactor reached 7 kg/cm$^2$G the polymerization reaction was stopped, and the unreacted vinyl chloride monomer was released for recovery when the pressure within the vessel was still higher than the atmospheric pressure and then sucked under a reduced pressure when there was no gauge pressure in the vessel. The time required for the polymerization reaction was 6 hours. After the polymerization, there was not observed any polymer build-up on the inner surfaces of the external cooling apparatus and the circulation pipe line. The polymer thus obtained was dehydrated, dried and then subjected to a quality test.

EXAMPLE 2

Polymerization was carried out in the same manner as in Example 1, except that 33 g of the same dispersing agent as used in Example 1 and 33 g of a partially saponified polyvinyl alcohol having a surface tension of 43 dynes/cm as a 0.1% aqueous solution and a velocity of 5 cps as a 4% aqueous solution, were used together. The time required for the polymerization was 6 hours. There was no polymer build-up in the external cooling apparatus or elsewhere. The polymer thus obtained was dehydrated, dried and then subjected to a predetermined quality test.

EXAMPLE 3

Polymerization was carried out in the same manner as in Example 1, except that 44 g of a mixture of equal amounts of the two types of the partially saponified polyvinyl alcohols used in Example 2 and 22 g of methyl hydroxypropyl cellulose having a surface tension of 46 dynes/cm as a 0.1% aqueous solution and a viscosity of 400 cps as a 4% aqueous solution, were used together, and an isoparaffin solution containing 50% of tertiary-butyl peroxy-pivalate was used as the polymerization initiator, of which 59.6 g was initially charged and 73.4 g was later added. The time required for the polymerization was 6 hours. The polymer thus obtained was dehydrated, dried and finally subjected to a quality test.

EXAMPLE 4

Polymerization was carried out in the same manner as in Example 2, except that after the external cooling of the polymerization slurry was started and the polymerization initiator was added to accelerate the reaction, 30 liters of vinyl chloride monomer were added from the pipe line 5 at a flow rate of 1 liter/min. The time required for the polymerization was 6 hours and 30 minutes. The polymer thus obtained was dehydrated, dried and then subjected to a quality test.

COMPARATIVE EXAMPLE 1

The same polymerization vessel as in Example 1 was used. Introduced into the vessel were 130 liters of deionized water, 66 g of a partially saponified polyvinyl alcohol having a surface tension of 47 dynes/cm as a 0.1% aqueous solution and a viscosity of 35 cps as a 4% aqueous solution, and 25.4 g of dioctyl peroxy-dicarbonate. The vessel was closed and the air therein was replaced with nitrogen. Then, 120 liters of vinyl chloride monomer were introduced and while stirring, the temperature within the vessel was raised to 58° C., whereupon the reaction was started.

The polymerization was conducted without the external cooling of the polymerization slurry, and after 10 hours, the pressure in the vessel decreased to 7 kg/cm$^2$. In the same manner as in Example 1, unreacted vinyl chloride monomer was recovered, and the polymer thus obtained was dehydrated, dried and then subjected to a quality test.

COMPARATIVE EXAMPLE 2

The vessel was charged in the same manner as in Example 1, and 30 minutes after the commencement of the polymerization (when the conversion reached 8%), the external cooling of the polymerization slurry was started, and one hour thereafter, the temperature and pressure within the vessel went out of order and it became difficult to continue the polymerization, and accordingly the polymerization was immediately stopped. The polymer thus obtained agglomerated abnormally. There were observed large amounts of the polymer adhered to the inner wall of the external cooling apparatus and to the inner wall of the circulation pipe line.

It is shown to be fairly difficult to start the external circulation cooling before the conversion reaches 20%.

EXAMPLE 5

A polymerization apparatus of the same type as illustrated in the drawing was used which had a polymerization vessel having a volume of 35 m$^3$ and an external cooling apparatus having a heat transfer surface area of 20 m$^2$.

Introduced into the polymerization vessel were 15.5 m$^3$ of deionized water, 7.3 kg of a mixture of equal amounts of two types of partially saponified polyvinyl alcohols having surface tensions of 47 dynes/cm and 43 dynes/cm respectively as 0.1% aqueous solutions, and viscosities of 35 cps and 5 cps respectively as 4% aqueous solutions, as the dispersing agent, and 4.8 kg of an isoparaffin solution containing 50% of tertiary-butyl peroxypivalate, as the polymerization initiator. The vessel was closed and the air therein was replaced with nitrogen. Then, while stirring, 14.5 m$^3$ of vinyl chloride monomer was introduced, and hot water was circulated to the jacket of the polymerization reactor to raise the temperature in the vessel to 58° C., whereupon the polymerization reaction was started.

When the heat generation occurs by the polymerization reaction, cooling water was circulated to the jacket of the polymerization vessel so as to maintain the temperature within the vessel at 58° C.

Three hours after the commencement of the polymerization, the conversion reached 28%. Then, the circulation of the polymerization slurry to the external cooling apparatus was started. At the same time, 5.9 kg of an isoparaffin solution containing 50% of tertiary-butyl peroxypivalate was added to accelerate the polymerization. The external circulation rate of the slurry was 200 m$^3$/hr and the velocity of the flow in the circulation pipe line was 1.5 to 2.5 m/sec. The system for control of the heat remoal was the same as in Example 1. The heat removal rate by the external cooling apparatus was 3×10$^5$ kcal/hr and the heat removal rate by the jacket of the polymerization vessel was controlled to be 0 to 4×10$^5$ kcal/hr, so that the temperature within the polymerization vessel was maintained at 58° C.

When the inner pressure of the polymerization vessel dropped to 7 kg/cm$^2$ after 8 hours of the polymerization, the polymerization reaction was stopped, and the same treatment as in Example 1 was carried out. The polymer thus obtained was subjected to a quality test. There was no polymer build-up on the inner surface of the external cooling apparatus or elsewhere.

In Example 5, if the polymerization were continued without the external cooling after 3 hours of the polymerization reaction and without acceleration of the polymerization reaction, the inner pressure of the polymerization vessel would drop to 7 kg/cm$^2$ after 12 hours and the polymerization reaction would then be stopped. In this case, vigorous heat generation due to the polymerization reaction would occur after 8 hours of the polymerization, and if the cooling were carried out only by the recycle of cooling water from the cooling water tower (normally the temperature of the cooling water is about 25° C.), it would only be possible to control the polymerization temperature by circulating a tremendous amount of cooling water as much as 300 tons/hr to the jacket of the polymerization vessel, which would be far beyond the economical level. It is impossible to shorten the polymerization time to less than 12 hours by this method. In other words, it is possible to shorten the polymerization time by 4 hours by using the external cooling.

EXAMPLE 6

The same polymerization apparatus as used in Example 5 was used. Introduced into the polymerization vessel were 13.5 m$^3$ of deionized water, 10.3 kg of the same dispersing agent as in Example 5, and 7.5 kg of an isoparaffin solution containing 50% of tertiary-butyl peroxy-neodecanoate as the polymerization initiator. The vessel was closed and the air therein was replaced with nitrogen. Then, while stirring, 12.0 m$^3$ of vinyl chloride were introduced and the temperature within the vessel was raised to 58° C., whereupon the polymerization reaction was started. Three hours after the commencement of the polymerization, the polymerization conversion reached 25% and then the external circulation cooling of the polymerization slurry was started. At the same time, 5.4 kg of the isoparaffin solution containing 50% of tertiary-butyl peroxy-neodecanoate and 2.0 m$^3$ of vinyl chloride monomer were added. The circulation rate for the external cooling of the slurry was 260 m$^3$/hr and the velocity of the flow in the circulation pipe line was 2.0 to 3.0 m/sec. The system for the heat removal was the same as in Example 1. The heat removal rate by the external cooling apparatus was 7×10$^5$ kcal/hr and the heat removal rate by the jacket of the polymerization vessel was adjusted within the range of 0 to 5×10$^5$ kcal/hr. After 6 hours of polymerization, the inner pressure of the polymerization vessel dropped to 7 kg/cm$^2$G and the polymerization was stopped and the same treatment as in Example 1 was carried out. The polymer thus obtained was subjected to a quality test. There was no polymer build-up on the inner surface of the external cooling apparatus or elsewhere.

EXAMPLE 7

The same polymerization apparatus as in Example 5 was used. Introduced into the polymerization vessel were 13.5 m³ of deionized water, 12.9 kg of the same dispersing agent as in Example 5, and 6.4 kg of an isoparaffin solution containing 50% of tertiary-butyl peroxy-neodecanoate as the polymerization initiator. The vessel was closed and the air therein was replaced with nitrogen. Then, while stirring, 12.0 m³ of vinyl chloride monomer were introduced and the temperature within the vessel was raised to 65° C., whereupon the polymerization reaction was started. Two hours and a half after the commencement of the polymerization, the conversion reached 20% and then the external circulation cooling of the polymerization slurry was started. At the same time, 5.1 kg of the isoparaffin solution containing 50% of tertiary-butyl peroxy-neodecanoate and 2.0 m³ of vinyl chloride monomer were added. Thereafter, the polymerization reaction was continued in the same manner as in Example 6. After 5 hours of polymerization, the pressure in the vessel dropped to 8 kg/cm²G and the polymerization was then stopped. The polymer thus obtained was treated in the same manner as in the previous examples and then subjected to a quality test. There was no undesirable polymer build-up on the inner surface of the external cooling apparatus or elsewhere.

COMPARATIVE EXAMPLE 3

Polymerization was carried out in the same manner as in Example 1 except that 88 g of the same dispersing agent as in Example 2 was used and one hour after the commencement of the polymerization reaction (when the conversion reached 13%), the external circulation cooling was started. There was certain disorder observed in the pressure within the vessel and the polymerization reaction was completed for 5 hours and 50 minutes. The polymer obtained comprised coarse particles of 0.5 to 1 mm and was not a normal product. There was a large amount of polymer build-up on the inner surface of the external cooling apparatus elsewhere.

COMPARATIVE EXAMPLE 4

Polymerization was carried out in the same manner as in Comparative Example 2 except that 156 liters of deionized water and 173 g of the same dispersing agent as in Example 3 were used, the amount of vinyl chloride monomer was decreased to 94 liters, and as the polymerization initiator, an isoparaffin solution containing 50% of dioctyl peroxy-dicarbonate was used initially in an amount of 39.8 g and later in an additional amount of 47.7 g. The external circulation cooling was started 30 minutes after the commencement of the polymerization reaction (when the conversion reached 8%), and, nevertheless, the polymerization reaction proceeded normally and the polymerization was completed in 5 hours and 45 minutes. However, the quality of the product thereby obtained was extremely poor.

The polymerization conditions and the polymerization results of Examples 1 to 7 and Comparative Examples 1 to 4 are shown in Table 1, and the results of the quality tests of the polymers thus obtained are shown in Table 2.

In Tables 1 and 2, Comparative Example 1 indicates the results obtained by a usual polymerization method. When compared with this as the basis, Examples 1 to 5 are shown to provide a product of superior quality and to make it possible to substantially shorten the time required for the polymerization.

TABLE 1

| | Examples | | | | | | | Comparative Examples | | | |
|---|---|---|---|---|---|---|---|---|---|---|---|
| | 1 | 2 | 3 | 4 | 5 | 6 | 7 | 1 | 2 | 3 | 4 |
| Polymerization conditions | 58 | 58 | 58 | 58 | 58 | 58 | 65 | 58 | 58 | 58 | 58 |
| Polymerization temperature (°C.) | | | | | | | | | | | |
| Initial charge | | | | | | | | | | | |
| VC (liter) | 120 | 120 | 120 | 120 | 14.5m³ | 12.0m³ | 12.0m³ | 120 | 120 | 120 | 94 |
| H₂O (liter) | 130 | 130 | 130 | 130 | 15.5m³ | 13.5m³ | 13.5m³ | 130 | 130 | 130 | 156 |
| Catalyst (g) | OPP 50.8 | OPP 50.8 | t-BPP 59.6 | OPP 50.8 | t-BPP 4.8 kg | t-BND 7.5 kg | t-BND 6.4 kg | OPP 50.8 | OPP 50.8 | OPP 50.8 | OPP 39.8 |
| Concentration (%/VC) | 0.023 | 0.023 | 0.027 | 0.018 | 0.018 | 0.029 | 0.025 | 0.023 | 0.023 | 0.023 | 0.023 |
| Dispersing agent | PVA 47/35 | PVA 47/35 | PVA 47/35 | PVA 47/35 | PVA 47/35 | PVA 47/35 | PVA 47/35 | PVA 47/35 | PVA 47/35 | PVA 47/35 | PVA 47/35 |
| Surface tension (dyn/cm)/viscosity (cps) | — | (43/5) | (43/5) | (43/5) | (43/5) | (43/5) | (43/5) | — | — | — | (43/5) |
| | — | — | MHPC (46/400) | — | — | — | — | — | — | — | MHPC (46/400) |
| (mixed ratio) | (single) | (1:1) | (1:1:1) | (1:1) | (1:1) | (1:1) | (1:1) | (single) | (single) | (single) | (1:1:1) |
| Concentration (%/VC) | 0.06 | 0.06 | 0.06 | 0.048 | 0.055 | 0.08 | 0.10 | 0.06 | 0.06 | 0.08 0.20 | |
| Conversion at the start of external cooling (%) | 30 | 30 | 30 | 30 | 28 | 25 | 20 | — | 8 | 13 | 8 |
| Additional catalyst (g) | OPP 60.9 | OPP 60.9 | t-BPP 73.4 | OPP 60.9 | t-BPP 5.9 kg | t-BND 5.4 kg | t-BND 5.1 kg | — | — | OPP 60.9 | OPP 47.7 |
| Concentration (%/VC) | 0.028 | 0.028 | 0.033 | 0.022 | 0.022 | 0.021 | 0.020 | — | — | 0.028 | 0.028 |
| Additional VC (liter) | — | — | — | 30 | — | 2.0m³ | 2.0m³ | — | — | — | — |
| Total VC/H₂O ratio | 0.92 | 0.92 | 0.92 | 1.15 | 0.94 | 1.04 | 1.04 | 0.92 | 0.92 | 0.92 | 0.60 |
| Polymerization results | | | | | | | | | | | |
| Polymerization time (hr) | 6 | 6 | 6 | 6.5 | 8 | 6 | 5 | 10 | Stopped after | 5.83 | 5.75 |

TABLE 1-continued

|  | Examples | | | | | | | Comparative Examples | | | |
|---|---|---|---|---|---|---|---|---|---|---|---|
|  | 1 | 2 | 3 | 4 | 5 | 6 | 7 | 1 | 2 | 3 | 4 |
| Productivity (T/m³·Y) | 213 | 213 | 213 | 253 | 241 | 300 | 340 | 147 | 1.5 | — | 172 |
| Polymer build-up on the inner surface of the external cooling apparatus | no | no | no | no | no | no | no | — | yes | yes | no |

OPP: dioctyl peroxy-dicarbonate
t-BPP: tertiary-butyl peroxy-pivalate
t-BND: tertiary-butyl peroxy-neodecanoate
PVA: polyvinyl alcohol
MHPC: methyl hydroxy propyl cellulose

TABLE 2

| Quality of PVC | Examples | | | | | | | Comparative Examples | | | |
|---|---|---|---|---|---|---|---|---|---|---|---|
|  | 1 | 2 | 3 | 4 | 5 | 6 | 7 | 1 | 2 | 3 | 4 |
| Polymerization degree | 1020 | 1025 | 1000 | 1020 | 1010 | 1010 | 780 | 1025 | — | — | 1015 |
| Bulk density | 0.502 | 0.492 | 0.500 | 0.520 | 0.501 | 0.518 | 0.557 | 0.508 | — | — | 0.475 |
| Particle size distribution (% by weight) | | | | | | | | | | | |
| larger than 60 mesh | 0.7 | 0.1 | 0 | 0.2 | 0.6 | 0.1 | 0.2 | 0.2 | Agglomerates | Coarse particles | 0 |
| 60–100 mesh | 53.0 | 47.6 | 12.5 | 54.9 | 52.4 | 56.4 | 31.4 | 49.7 | | | 5.9 |
| 100–145 mesh | 37.1 | 42.5 | 68.7 | 37.5 | 41.6 | 38.3 | 54.4 | 43.4 | | | 65.4 |
| 145–250 mesh | 8.5 | 9.5 | 18.0 | 7.1 | 5.2 | 5.1 | 13.0 | 6.6 | | | 25.9 |
| smaller than 250 mesh | 0.7 | 0.3 | 0.8 | 0.3 | 0.2 | 0.1 | 1.0 | 0.1 | | | 2.8 |
| DOP absorption time (min.) | 7 | 6 | 5 | 6 | 7 | 7 | 8 | 7 | — | — | 7 |
| Plastograph Fusion time (min.) | 12 | 9 | 9 | 10 | 9 | 10 | 7 | 11 | — | — | 14 |
| Fish eyes (numbers) | 100 | 10 | 4 | 12 | 8 | 6 | 2 | 85 | — | — | 120 |
| Thermal stability Time for decomposition (min.) | 68 | 70 | 75 | 71 | 74 | 75 | 68 | 70 | — | — | 58 |

The productivity (T/m³·Y) in Table 1 indicates calculated values of annual production (T) per volume (m³) of the polymerization vessel.

The polymerization degree, bulk density and particle size distribution in Table 2 were measured according to JIS K-6721.

The time for absorption of DOP (dioctyl phthalate) was measured by means of a planetary mixer made by Bravender Co. The rotational speed of the mixer was 70 rpm. 400 g of sample polymer was fed into the mixer and after a preliminary heating at 80° C. for 5 minutes, 200 g of DOP was introduced. The time until the stirring torque dropped abruptly due to the absorption of DOP by the polymer was measured as the DOP absorption time.

The fusion time of the polymer was also measured by use of a plastograph made by Bravender Co. 60 g of a mixture comprising 100 parts of sample polymer, 3 parts of lead stearate and 0.5 part of barium stearate were introduced in the plastograph and after a preliminary heating at 187° C. for 3 minutes, stirring was commenced at a rotational speed of the rotor being 45 rpm. The time when the stirring torque reached the maximum was regarded as the fusion point and the period of time to reach such a point was measured as the time of fusion.

Fish eyes are non-gelled polymer particles remaining when the polymer is formed into a sheet. 100 parts of sample polymer, 50 parts of DOP, 3 parts of dioctyl laurate, 1 part of zinc stearate, 0.5 part of stearyl alcohol and 0.1 part of carbon black were mixed by mixing rollers at 155° C. for 5 minutes and formed into a sheet of a thickness of 0.5 mm. The number of fish eyes per 10×10 cm² of the sheet was counted by using a magnifying glass.

The heat stability tests were carried out in such manner that the same mixture as used for the measurement of the time of fusion by means of the plastograph was mixed by mixing rollers at 160° C. for 5 minutes and the sheet thus obtained was heated in an air bath at 190° C. and the time until the black spots due to the heat decomposition appeared on the surface of the sheet was measured.

What we claim is:

1. In a process for the batchwise suspension polymerization of a reaction mixture comprising vinyl chloride, wherein the suspension polymerization of vinyl chloride, in the presence or absence of an ethylenically unsaturated monomer copolymerizable therewith, in an aqueous medium in the presence of a dispersing and an oil-soluble polymerization initiator is carried out in a polymerization reaction zone connected via a circulation line to an external cooling zone, the improvement wherein the volume ratio of the total monomer charge to the amount of water is kept at a level of more than 0.8 and the amount of said dispersing agent used is 0.03 to 0.1% by weight based on the total charge of the monomer, and circulation of the polymerization reaction mixture to the external cooling zone is initiated after the conversion of the monomer in the polymerization reaction mixture reaches at least 20% by weight, and wherein an additional amount of the oil-soluble polymerization initiator is added to the polymerization reaction mixture after the initiation of its circulation, and wherein during the circulation of the polymerization mixture, the monomer is additionally added thereto thereby to maintain the volume ratio of the total monomer charge/water at the range of 0.8 to 1.3.

2. A process for the suspension polymerization of vinyl chloride, as claimed in claim 1, wherein the circulation of the polymerization reaction mixture is initiated after the conversion of the monomer reaches 25%.

3. A process for the suspension polymerization of vinyl chloride, as claimed in any one of claims 1 or 2, wherein at least one of the dispersing agents used has a surface tension of less than 50 dynes/cm as measured in 0.1% aqueous solution at 20° C. and has a viscosity of less than 500 cps as measured in 4% aqueous solution at 20° C.

4. A process for the suspension polymerization of vinyl chloride, as claimed in claim 1 or 2, wherein the circulation of the polymerization reaction mixture through the external cooling zone is effected by maintaining the linear flow velocity of 1-4 m/sec.

5. A process for the suspension polymerization of vinyl chloride, as claimed in any one of claims 1 or 2, wherein the rate of heat removal in the external cooling zone is kept constant while controlling the removal of heat from the polymerization reaction zone, thereby to maintain the polymerization reaction temperature at a desired level.

6. A process for the suspension polymerization of vinyl chloride, as claimed in claim 1 or 2, wherein at least one of the dispersing agents used has a surface tension of less than 50 dynes/cm as measured in 0.1% aqueous solution at 20° C. and has a viscosity of less than 500 cps as measured in 4% aqueous solution at 20° C.

7. A process for the suspension polymerization of vinyl chloride, as claimed in claim 1 or 2, wherein the rate of heat removal in the external cooling zone is kept constant while controlling the removal of heat from the polymerization reaction zone, thereby to maintain the polymerization reaction temperature at a desired level.

8. A process for the suspension polymerization of vinyl chloride, as claimed in claim 5, wherein the rate of heat removal in the external cooling zone is kept constant while controlling the removal of heat from the polymerization reaction zone, thereby to maintain the polymerization reaction temperature at a desired level.

9. A process for the suspension polymerization of vinyl chloride, as claimed in claim 4, wherein the rate of heat removal in the external cooling zone is kept constant while controlling the removalof heat from the polymerization reaction zone, thereby to maintain the polymerization reaction temperature at a desired level.

* * * * *